（12）United States Patent
Lynette et al.

(10) Patent No.: US 8,089,891 B2
(45) Date of Patent: Jan. 3, 2012

(54) SYSTEM AND METHOD FOR AUDITING ROUTE PARAMETERS IN A NETWORK

(75) Inventors: Troy Lynette, Broomfield, CO (US);
Gregory Brown, Broomfield, CO (US);
Brad Smeal, Bethel Park, PA (US)

(73) Assignee: Level 3 Communications, LLC, Broomfield, CO (US)

( * ) Notice: Subject to any disclaimer, the term of this patent is extended or adjusted under 35 U.S.C. 154(b) by 918 days.

(21) Appl. No.: 11/966,752

(22) Filed: Dec. 28, 2007

(65) Prior Publication Data

US 2009/0168652 A1    Jul. 2, 2009

(51) Int. Cl.
*H04L 1/00*     (2006.01)
*H04L 12/26*    (2006.01)
*H04L 12/28*    (2006.01)
*H04L 12/56*    (2006.01)

(52) U.S. Cl. ............... 370/252; 370/392; 370/395.31
(58) Field of Classification Search ............... 370/252, 370/389, 392, 395.31
See application file for complete search history.

(56) References Cited

U.S. PATENT DOCUMENTS

| 5,949,872 | A   | * | 9/1999 | Khalil et al. ........... 379/230 |
| 6,614,765 | B1  | * | 9/2003 | Bruno et al. ........... 370/255 |
| 2002/0136374 | A1 | * | 9/2002 | Fleischer et al. ...... 379/114.01 |
| 2008/0102851 | A1 | * | 5/2008 | Bodnar .................. 455/452.2 |

* cited by examiner

*Primary Examiner* — Ronald Abelson

(57) ABSTRACT

A system includes a collector module configured to collect route parameters from a selected node of a plurality of nodes in the network, wherein the route parameters from the selected node are indicative of a first route to a destination address and a second route to the destination address; and a route processor configured to determine a first intermediate node along the first route communicatively coupled to the destination address and a second intermediate node along the first route communicatively coupled to the destination address, based at least in part on the collected route parameters. A method includes collecting route parameters from a first intermediate node and a second intermediate node that can be configured to communicatively couple a source node to the destination node, determining at least a first route through the first intermediate node and a second route through the second intermediate node, and determining which route among the first route and the second route is optimal according to one or more criteria.

14 Claims, 13 Drawing Sheets

| HOME | LNP LOOKUP | PCT | IDD/CRE | SS7 AUDIT | | | |
|---|---|---|---|---|---|---|---|
| | DASHBOARDS | REPORTS | | | | | |
| | STP DASHBOARD | | | | | | |
| | TNS BILL DASHBOARD | | | | | | |
| | SWITCH DASHBOARD | | | | | | |
| STP POINT CO | | LAST UPDATED | PAIR SYNCHRONIZED | | TNS BILL XREF | SWITCH XREF | |
| 5-38-36 5-63-21 | MCLEAN | JUN 7, 2007 JUN 7, 2007 | | | X | X | |
| 5-22-81 5-21-241 | DENVER SAN DIEGO | JUN 7, 2007 JUN 7, 2007 | X | | X | X | |
| 2-47-31 2-47-32 | PITTSBURGH ATLANTA | JUN 27, 2007 JUN 27, 2007 | X | | X | X | |
| 1-255-4 1-255-3 | ANAHEIM SAN FRANCISCO | MAY 20, 2007 MAY 20, 2007 | X | | X | X | |
| 1-255-1 1-255-0 | HOUSTON KANSAS CITY | JUN 17, 2007 JUN 17, 2007 | X | | X | X | |

STP DASHBOARD

FIG. 9

| HOME | LNP LOOKUP | PCT | IDD/CRE | SS7 AUDIT |
|---|---|---|---|---|
| DASHBOARDS / REPORTS | | | | |

| STP POINT CODE | STP NAME | LAST UPDATED | PAIR SYNCHRONIZED | TNS BILL XREF | SWITCH XREF |
|---|---|---|---|---|---|
| 5-38-36 | CAMBRIDGE | JUN 7, 2007 | | X | X |
| 5-63-21 | MCLEAN | JUN 7, 2007 | X | | |
| 5-22-81 | DENVER | JUN 7, 2007 | | X | X |
| 5-21-241 | SAN DIEGO | JUN 7, 2007 | X | | |
| 2-47-31 | PITTSBURGH | JUN 27, 2007 | X | X | X |
| 2-47-32 | ATLANTA | JUN 27, 2007 | | | |
| 1-255-4 | ANAHEIM | MAY 20, 2007 | X | | |
| 1-255-3 | SAN FRANCISCO | MAY 20, 2007 | | | |
| 1-255-1 | HOUSTON | JUN 17, 2007 | X | X | X |
| 1-255-0 | KANSAS CITY | JUN 17, 2007 | | | |

STP DASHBOARD ~1100

DETAILS FOR POINT CODE 252-122-52
EXPORT TO EXCEL ✕ ~1102

STP DETAILS ~1104

| OPC | DPC | CLLI | NAME |
|---|---|---|---|
| 1-255-0 | 252-122-52 | MMPHTNMTDSO | KANSAS CITY |
| 1-255-1 | 252-122-52 | MMPHTNMTDSO | HOUSTON |
| 5-21-241 | 252-122-52 | MMPHTNMTDSO | SAN DIEGO |
| 5-63-21 | 252-122-52 | MMPHTNMTDSO | MCLEAN |
| 5-22-81 | 252-122-52 | MMPHTNMTDSO | DENVER |

TNS BILL DETAILS

| OPC | DPC | LATA | NAME | SS7 PROVIDER |
|---|---|---|---|---|
| 207-67-1 | 252-122-52 | 468 | ACTIVE WEEKLY REPORT 6-13-2007.XLS | TNS |

SWITCH DETAILS ~1108

| OPC | DPC | NAME |
|---|---|---|
| 2-1-209 | 252-122-52 | DENSGX1-DENND1 |
| 2-1-209 | 252-122-52 | DENSGX2-DENND1 |
| 207-67-1 | 252-122-52 | DALMGC1 |

STP DIFFERENCE REPORT ✕

| | 5-38-36 | | 5-63-21 | |
|---|---|---|---|---|
| | CLLI | | PC | CLLI |
| X | X | | 2-2-2 | TESTTEST |
| X | X | | 3-3-3 | TESTTEMP |
| X | X | | 4-4-4 | TEMPTEST |
| X | X | | 5-5-5 | TEMP005 |
| X | X | | 249-128-13 | LBRLKS04DS1 |
| X | X | | 250-72-2 | WPCAWI11DSO |
| X | X | | 252-122-52 | MMPHTNMTDSO |
| | | | 252-122-161-2 | BTRGLAGWDSO |
| | | | 252-161-11 | DNSPLAMADSO |

| | HOME | LNP LOOKUP | REPORTS | PCi | IDD/CRE | SS7 AUDIT |
|---|---|---|---|---|---|---|
| | | | POINT CODE REPORT | | | |
| | | | SWITCH DETAILS REPORT | | | |

SS7 AUDIT HOME | DASHBOARDS
SWITCH DETAILS REPORT
SWITCH:
BALMGC1 ▼

STP PAIRS:
☑ CAMBRIDGE (5-38-36)/MCLEAN (5-63-21)
☑ DENVER (5-22-81)/SAN DIEGO (5-21-241)
☐ PITTSBURGH (2-47-31)/ATLANTA (2-47-32)
☐ ANAHEIM (1-255-4)/SAN FRANCISCO (1-255-3)
☐ HOUSTON (1-255-1)/KANSAS CITY (1-255-0)

[SUBMIT]

DETAILS FOR SWITCH BALMGC1
EXPORT TO EXCEL ✕

| POINT CODE | TNS BILL XREF | SWITCH DETAILS | | | |
|---|---|---|---|---|---|
| | | CAMBRIDGE | MCLEAN | DENVER | SAN DIEGO |
| 246-192-1 | ✓ | ✓ | ✓ | X | X |
| 246-192-3 | ✓ | ✓ | ✓ | X | X |
| 246-192-4 | ✓ | ✓ | ✓ | X | X |
| 246-192-5 | ✓ | ✓ | ✓ | X | X |
| 246-192-7 | ✓ | ✓ | ✓ | X | X |
| 246-192-8 | ✓ | ✓ | ✓ | X | X |
| 246-192-9 | ✓ | ✓ | ✓ | X | X |
| 246-192-10 | ✓ | ✓ | ✓ | X | X |
| 246-192-11 | ✓ | ✓ | ✓ | X | X |
| 246-192-12 | ✓ | ✓ | ✓ | X | X |

FIG. 12

SYSTEM AND METHOD FOR AUDITING ROUTE PARAMETERS IN A NETWORK

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2007 Level 3 Communications, LLC.

TECHNICAL FIELD

Embodiments of the present invention generally relate to network communications. More specifically, embodiments relate to auditing routes in a network based on route parameters.

BACKGROUND

When a telephone call is made there are two distinct pieces of the call. First, there is call signaling that happens across various telephone networks to indicate a user wishes to make a phone call. This signaling involves events familiar to all users like ringing, answer, busy, etc. The call signaling also includes telephone carrier information such as the physical line and channel to use for the call. Second, once the call signaling is complete, the voice (media) channel is setup using the agreed upon information exchanged in the call signaling and a phone call ensues. The call signaling messages themselves are routed across numerous network elements during the call set up phase. The routes that call signaling messages take depend on the network configuration, routes between various telephone carrier networks and other factors. In some cases there may be multiple routes between various network elements and the telephone carriers' networks. Management of those routes, as well as determining the most efficient, cost effective route for call set up signaling can be a formidable task.

It is with respect to these and other considerations that embodiments of the present invention have been made.

SUMMARY

Embodiments of the present invention generally relate to network communications. More specifically, embodiments relate to auditing routes in a network based on route parameters.

An embodiment of a computer-implemented method for auditing routes in a network includes collecting route parameters from a first node in the network, wherein the route parameters are indicative of routes configured in the first node, and, based at least in part on the route parameters from the first node, determining whether routes indicated by the route parameters from the first node correspond to routes configured in a second node in the network. The first node and the second node may comprise a mated pair of nodes. The mated pair of nodes comprises a Signal transfer Point (STP).

The method may further include determining whether a route configured in a third node that is homed to the first node is also configured in the first node. Still further, the method may include collecting route parameters from a non-network source identifying route parameters indicative of routes purportedly used by the first node; and determining whether a discrepancy exists between routes indicated by the non-network source of route parameters and the routes indicated by the route parameters collected from the first node. The non-network source of route parameters may include one or more of a bill, a report, or an invoice. The route parameters from the first node may include one or more point codes and one or more route costs. The network may include a Signaling System 7 (SS7) network.

Another embodiment of a method is a method for choosing a route to be used between a source node and a destination node. The method may include collecting route parameters from a first intermediate node and a second intermediate node that can be configured to communicatively couple the source node to the destination node; based on the collected route parameters, determining at least a first route through the first intermediate node and a second route through the second intermediate node, wherein the first and second routes can be used by the source node to communicate with the destination node; and determining which route among the first route and the second route is optimal according to one or more criteria.

One or more of the criteria can include route cost. The network may include a Signaling System 7 (SS7) network. The source node may include a Signal switching Point (SSP). The first intermediate node or the second intermediate node may include a Signal transfer Point (STP). The route parameters may include one or more point codes and one or more route costs.

An embodiment of a system for auditing routes in a network includes a collector module configured to collect route parameters from a selected node of a plurality of nodes in the network, wherein the route parameters from the selected node are indicative of a first route to a destination address and a second route to the destination address, and a route processor configured to determine a first intermediate node along the first route communicatively coupled to the destination address and a second intermediate node along the first route communicatively coupled to the destination address, based at least in part on the collected route parameters.

The route processor may be further configured to determine a route cost for the first route and a route cost for the second route. The may further include a reporting module configured to generate a report showing identifiers of the first intermediate node and the second intermediate node in association with an identifier of the selected node. The destination address may comprise a destination point code. The first intermediate nodes may be included in a first mated pair of nodes and the second intermediate node is included in a second mated pair of nodes distinct from the first mated pair of nodes. The first mated pair and the second mated pair may be mated pairs of signal transfer points (STPs).

BRIEF DESCRIPTION OF THE DRAWINGS

FIGS. 9-12 illustrate exemplary user interfaces and reports that can be used in auditing systems according to various embodiments.

Figure 1:
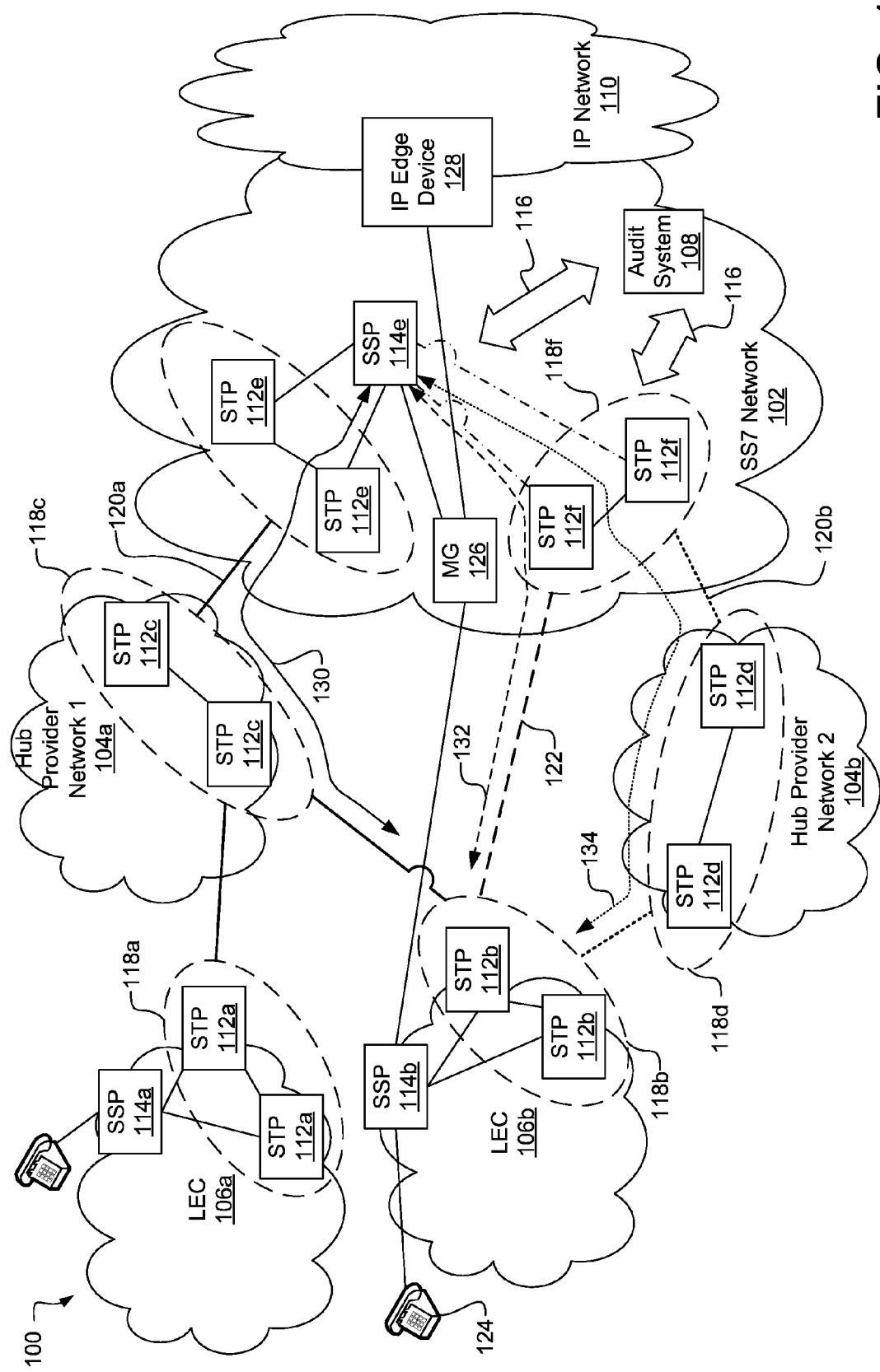
FIG. 1 illustrates an operating environment suitable for performing route auditing in accordance with various embodiments.

While the invention is amenable to various modifications and alternative forms, specific embodiments have been shown by way of example in the drawings and are described in detail below. The intention, however, is not to limit the invention to the particular embodiments described.

DETAILED DESCRIPTION

Embodiments of the present invention generally relate to network communications. More specifically, embodiments relate to auditing routes in a network based on route parameters.

Prior to describing one or more preferred embodiments of the present invention, definitions of some terms used throughout the description are presented.

Definitions

A "node" is an addressable device in a network.

The phrase "in a network" or similar phrases mean "communicatively coupled to a network".

An "intermediate node" is a node that routes traverse between other nodes.

A "module" is a self-contained functional component. A module may be implemented in hardware, software, firmware, or any combination thereof.

The terms "connected" or "coupled" and related terms are used in an operational sense and are not necessarily limited to a direct connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The terms "responsive" and "in response to" includes completely or partially responsive.

The term "computer-readable media" is media that is accessible by a computer, and can include, without limitation, computer storage media and communications media. Computer storage media generally refers to any type of computer-readable memory, such as, but not limited to, volatile, non-volatile, removable, or non-removable memory. Communication media refers to a modulated signal carrying computer-readable data, such as, without limitation, program modules, instructions, or data structures.

Exemplary System

Embodiments described herein relate to Signaling System 7 (SS7) used in the Public Switched Telephone Network (PSTN) and other networks. This is merely for illustrative purposes, and the invention is not limited to these particular embodiments. Those skilled in the art may readily find the concepts illustrated here to be useful in many other network applications where communications may be routed through a number of different routes via nodes.

SS7 is an out-of-band signaling protocol for setting up telephone calls. Generally when a call is made, a signal is sent to a switch, for example, at a Local Exchange Carrier (LEC) network. From the switch, SS7 messages are sent to a signal transfer point (STP) which routes set up signaling messages to another STP in another network, which has routing information indicating which telephone carrier should handle the call. Call signaling is then routed to STPs of another telephone carrier network that the called party is connected to. STPs in the last network notify a switch, which sets up a media path through another device, such as a media gateway. The media path carries the actual voice conversation.

Embodiments described herein can audit signaling routes to determine useful information about the routes. Some embodiments relate to identifying multiple available routes for signaling to the same destination. Multiple routes may be available that can be used to communicate signaling. For example, when two networks merge, network devices in both networks may be configured to send signaling messages to the same destination, but through different routes. In such cases, it may be more cost effective to use only one of the routes.

Some embodiments relate to determining discrepancies between different sources of route information. Discrepancies can arise as to what routes are being used. Comparisons can be made between different sources of data to identify and report the discrepancies to a user who may be able to resolve the discrepancies.

Some embodiments relate to determining whether a route for signaling is dead, which means the route is configured in a node, but the route cannot be used because of an error in a network configuration. For example, some devices in a network may be configured to utilize a route that traverses another intermediate device, but the intermediate device may not be configured with the route. In such a case, the route is not viable. These and other issues can be addressed through embodiments of a route auditing system described herein.

FIG. 1 illustrates an operating environment 100 suitable for performing route auditing in accordance with various embodiments. In this embodiment, routes to be audited are signaling routes within an SS7 network 102, hub provider networks 104 and/or local exchange carrier (LEC) networks 106. An auditing system 108 is in communication with network nodes of the SS7 network 102 to collect route parameters indicative of routes configured on the network nodes. The auditing system 108 may process the route parameters and report route and node information based on the processing.

In this particular embodiment, the SS7 network 102 is an edge network that manages access to one or more other networks, such as an IP network 110 or LEC networks 106. Hub provider networks 104 act as interface networks, by facilitating signal communications for call set up between the SS7 network 102 and the LEC networks 106. As discussed, the auditing system 102 is in communication with nodes of the SS7 network, such as, but not limited to, STPs 112 and Signal Switching Points (SSPs) 114 (also referred to as switches). For ease of illustration, the connections 116 between the auditing system 102 and the network nodes are shown using arrowed data bus symbols to depict multiple communication paths to numerous network nodes. The STPs 112 may be referred to as intermediate nodes because they generally reside between other nodes, such as switches. Switches are at times referred to as originating nodes or destination nodes, depending on the context.

The switches 114 may be any of various types of switches in the industry, and may depend on the particular implementation. By way of example, and not limitation, the switches 114 in the LEC networks 106 may be 5E or DMS type switches. By way of further example, but not limitation, switches 114 in the SS7 network 102 may include a media gateway controller (MGC) or an SGX™. For ease of description only a few switches and STP pairs are shown in FIG. 1. Although only a few switches and STPs are shown, it will be understood that in actual operation, networks such as those shown in FIG. 1 are typically made up of many more switches and STP pairs than illustrated.

In accordance with some embodiments, some network nodes are configured as node pairs, such as STP pairs 118. An STP pair 118 is a mated pair of STPs 112. The STPs 112 in a node pair 118 are typically located at different geographic locations. For example, a first STP 112 may be in Los Angeles, Calif. and another STP 112 may be in San Jose, Calif. Such paired configurations allow for fail over, whereby if one STP 112 in the pair 118 fails, the other STP 112 can handle the failed STP's 112 traffic. The STPs 112 of the SS7 network 102 may be deployed at gateways that provide access to the IP network 110.

Because STPs 112 are configured as pairs 118, they are connected to other STP pairs 118 in "quad" connections 120. Quad connections 120 are illustrated in FIG. 1 as thicker lines between STP pairs 118. In a quad connection 120, each STP 112 in a first STP pair 118 is connected to both STPs 112 in the other pair 118. For example, both STPs 112e in pair 118e are connected to both STPs 112c in pair 118c. This may be referred to as a full mesh configuration. Each of the switches 114 is "homed" to an STP pair 118, which means that the switch is configured to communicate through the STP pair 118. For example, switch 114e is initially homed to STP pair 118e; however, switch 114e can be re-homed to another STP pair 118f.

Quad connections 120 reside between the SS7 network 102 and hub provider networks 104, and between hub provider networks 104 and LEC networks 106. Through the quad connections 120 and the hub provider networks 104, signaling messages can be communicated between the STPs 112 of the SS7 network 102 and the STPs 112 of LEC networks 106. In some cases node pairs are connected in a direct quad arrangement between networks. A direct quad connection 122 is shown in FIG. 1 between STP pair 118 of the SS7 network 102 and the STP pair 112 of the LEC network 106b.

A call can be set up between a telephone 124 connected to switch 114b of LEC network 106b and another communication device (not shown) coupled to the IP network 110. In one scenario, based on signaling between switch 114b of the LEC network 114b and switch 114e of the SS7 network 102, a media path is set up between switch 114b and a media gateway 126 that may be controlled by the switch 114e. The media gateway 126 communicates with an IP edge device 128 to facilitate real time communications (e.g., voice) to flow between the MG 126 and the IP edge device 128. In one embodiment, the IP edge device 128 is a network border switch (NBS).

An embodiment of the auditing system 108 is configured to determine if multiple signaling routes exist between network nodes, such as switches. The embodiment of the auditing system 108 may be further configured to determine which of those routes is optimal according to one or more criteria, such as cost. If, for example, a node is initially configured to use a specified route, and another different route to the same destination address becomes available that is more favorable than the first route, the node can be reconfigured, through provisioning, to use the more favorable route. This embodiment of the auditing system 108 has functionality to determine such available routes and may be further capable of analyzing the routes to determine a "best" route. According to some embodiments, a media route is uniquely defined by an originating address, a destination address, and a circuit between the addresses. In the SS7 signaling environment, for purposes of auditing signaling routes, the signaling routes can be described in terms of a destination address and an origination address. For example, a destination point code (DPC) (destination address) and an originating point code (OPC) (originating address) correspond to signaling endpoints at the ends of signaling route(s) to be audited between the endpoints.

To illustrate, in one scenario it is assumed that switch 114e is initially configured to use a signaling route 130 via STP pairs 118c and 118b. In this scenario, one or more other signaling routes become available between switch 114e and switch 114b. In the particular embodiment shown, another possible signaling route 134 becomes available via STP pair 118d through hub provider network 104b. In addition, another possible route 132 becomes available between STP pair 118f and STP pair 118b via direct quad 122. Signaling route 132 and signaling route 134 may become available through growth of the SS7 network 102, for example, by merging with another network that includes the routes or adding by capacity in the SS7 network 102.

By analyzing destination addresses provisioned on nodes in network 102, the auditing system can identify the available signaling routes 130, 132 and 134. These multiple routes can be reported to the user. In addition, the cost of the routes can be determined and reported to the user. Based on such information, the switch 114e may be reprovisioned to use a different route. For example, switch 114e may be provisioned to use route 132 through the direct quad 122. In this case, the switch 114e will be homed to STP pair 118f, and will no longer be homed to STP pair 118e.

Another embodiment of the auditing system 108 can determine discrepancies between route information obtained from different sources of route information. The sources may be non-network sources or network-based sources, such as network nodes. A non-network source may be a bill from a hub provider.

For example, hub provider 104a typically charges the provider of the SS7 network 102 for the usage of routes through the hub provider network 104a. If the switch 114e is configured to use the routes through hub provider network 104a and the bill accurately reflects the use of the routes, then there are no discrepancies. However, if the bill from the hub provider 104c does not indicate the routes are being used from the switch 114e when the switch 114e is configured to use the routes there is a discrepancy. Also if the switch 114e is not configured to use the routes through the hub provider network 104e, but the hub provider bill includes charges for using the routes, there is a discrepancy. Both types of discrepancies can be problematic. In the first case, if the hub provider incorrectly believes the routes are not being used when they actually are, the hub provider may shut down those routes, causing failed calls through the switch 114e. In the second case, obviously SS7 network 102 provider will not want to be charged for use of routes through hub provider network 104a that the SS7 network 102 is not actually using.

Yet another embodiment of the audit system 108 is configured to process information about STP pairs 118 to determine whether the STPs 112 in an STP pair 118 are synchronized. Typically, STPs 112 in a mated pair 118 should be synchronized. For example, in FIG. 1, STPs 112e of STP pair 118e should be synchronized so they can reach the same destinations. Two STPs 112 are synchronized if the STPs 112 are configured to access the same routes. This determination can be made by checking whether the STPs 112 in a mated pair of STPs 118 are provisioned with the same routes to destination addresses (destination point codes (DPCs)).

Yet another embodiment of the audit system 108 is configured to determine dead, or invalid, routes. To illustrate, assume an originating node, such as switch 114e, is provisioned with a destination address of another node, for example destination point code for switch 114b. Further assume that the switch 114e is provisioned with route 130 through STP 112e to reach the switch 114b. Also, assume however, that the STP 112e is not provisioned with the destination point code for switch 114b. In such a situation, the route 130 is considered dead or invalid because, even though switch 114e is provisioned with the address of switch 114b, switch 114e cannot reach switch 114b because STP 112e is not provisioned to reach switch 114b. As discussed further below, an embodiment of the audit system 108 can determine nonviable routes, such as these.

Figure 2:
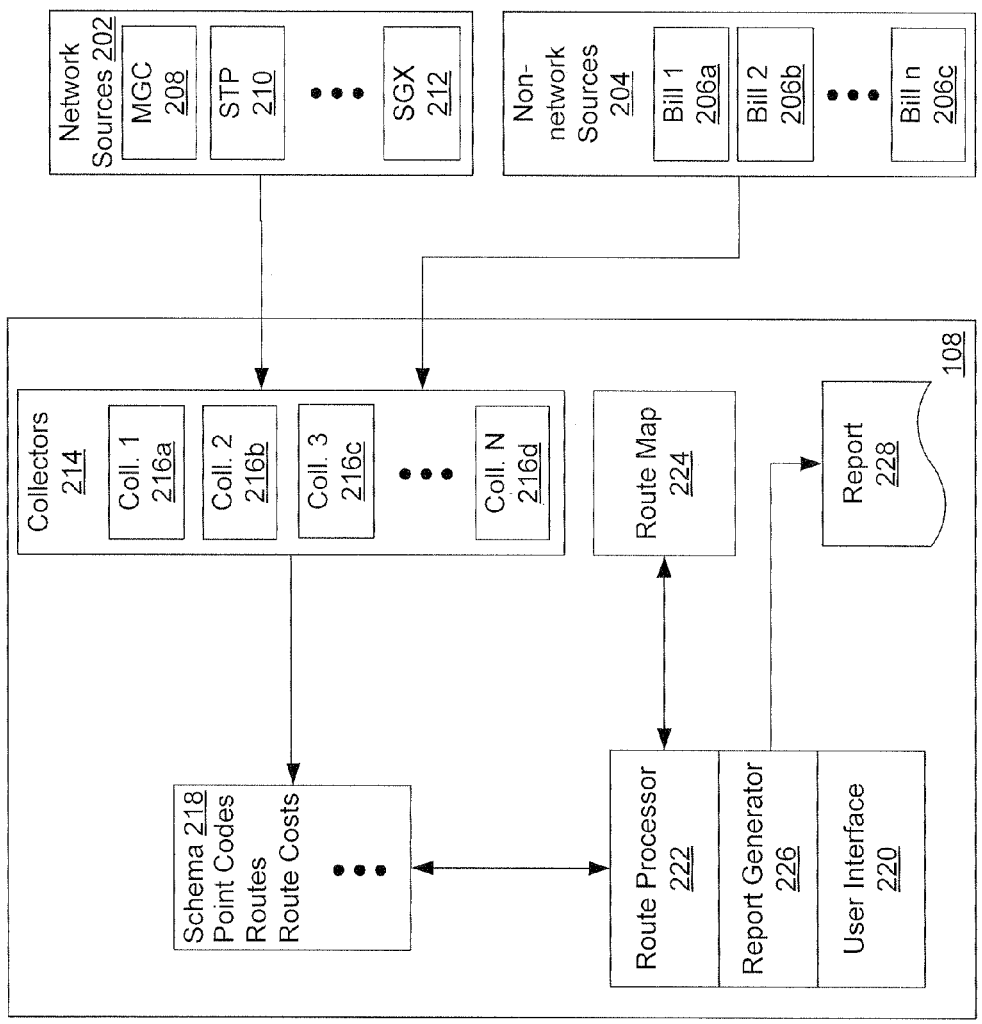
FIG. 2 illustrates a route auditing system in accordance with an embodiment.

FIG. 2 illustrates a route auditing system 108 in accordance with an embodiment. The auditing system accesses a set of network sources 202 of route information and a non-network source 204 of route information. One embodiment of the auditing system 108 comprises a web application (webapp), which can be accessed by one or more users or other applications over the Internet or an intranet. The auditing system 108 uses information, such as route information, obtained from the network sources 202 and the non-network sources 204 to process routes and report route information.

The non-network source 204 may be, for example, an accounting system, a billing system, a procurement system, or others. In the embodiment illustrated, the non-network source 204 includes a number of bills 206. The bills could be bills from a hub network provider. Other non-network sources of route information could be cost statements, invoices, procurement contracts, service level agreements, or others. The network sources 202 could be network nodes, such as a media gateway controller 208, STP 210, SGX™ 212, or others. In the illustrated embodiment, the auditing system 108 includes a set of one or more collector modules 214.

In some embodiments, each collector module 216 is operable to communicate with, and collect route information from, a specified type of source. In these embodiments, each collector module 216 contacts or accesses each source of the type associated with the given collector module. For example, collector module 216a may be a MGC type collector. In this case, the collector module 216a contacts the MGC source(s) 208 in the network to collect route information from the one or more MGCs 208. As another example, collector module 216b may be an STP type collector that contacts STPs 210 in the network to collect route information from the STPs. Still further, the collector 216c may be an SGX type collector for collecting route information from the SGX 212. Collector module 216d may be a non-network source collector that is configured to collect route information from non-network sources 204, such as one or more bills 206.

In embodiments where each collector 216 is associated with a type of network source, each collector 216 is configured to collect route information from the associated source using commands, messages or requests associated with the type of network source. For example, in the case of an MGC 208, an MGC collector 216a may issue CORBA calls to the MGC 208 that cause the MGC 208 to transmit route information to the collector 216a. In the case of an STP 210, an STP collector 216b in may set up a Telnet connection with the STP 210 and issue commands to the STP 210 to retrieve routes or retrieve link sets. In the case of an SGX 212, the SGX 212 generally creates a file (e.g., a routing table) of route information that an SGX collector 216c can retrieve.

A non-network source collector module 216d can obtain route information in one or more ways. In one embodiment, the non-network source collector 216d receives bills via email. The bill 206 may be embedded in the email message or attached as an attachment. In another embodiment, bills 206 may be stored in a repository that is accessible by the non-network source collector 216d. In this embodiment, the non-network source collector 216d could periodically automatically retrieve bills 206 from the repository.

The collectors 216 collect one or more types of route information from the sources. In one embodiment, the route information includes route parameters that are indicative of routes configured or provisioned on the sources (in the case of network sources) or routes indicated in non-network sources. By way of example, the route information may include node addresses, point codes (e.g., destination point codes, originating point codes), route costs, fees charged for use of routes, CICs and others. Different types of information may be collected from different types of sources. Information from different types of sources may be in different formats.

After a collector 216 collects route information from the source, the collector parses the information and stores some or all of the information in memory (e.g., a data base or other repository). The parsing algorithm used by each collector 216 may vary, depending on the source type associated with the collector. In one embodiment, the collectors 216 store the data according to a schema 218 or other template. Because data from different types of sources can be in different formats, each collector 216 is operable to read and parse the format of the associated source.

The collector modules 216 may collect information automatically or in response to a command (e.g., a user command), or a combination. For example, one or more of the collectors 216 may automatically contact their respective source and collect the route information on a weekly or monthly basis and/or the collectors 216 may contact the sources and collect when triggered by some command input. In one embodiment, the collector modules 216 are launched sequentially or in parallel by a server application.

A user interface 220 receives input from a user and provides output to the user. User input could include a request for a certain type of report, request for information about a specified node or node pair, or otherwise. Exemplary graphical user interfaces are shown in FIGS. 9-12 and discussed further below.

An route processor 222 reads data from the route information schema 218 and generates a map 224 of routes between network nodes. For example, with reference to FIG. 1, the route map 224 may include originating addresses, destination addresses and circuit identifiers for route 230, route 232, and route 234 associated with switch 114e. The route map 224 can be in any of numerous formats. For example, the map 224 may be a relational association of addresses and/or circuits associated with routes. The map 224 may be hierarchical or a tree structure. Regardless of the format of the route map 224 the route processor 222 is operable to extract selected data from the map 224 in response to commands.

In one embodiment a reporting module 226 can issue commands to the route processor 222 to extract selected information for the generation of one or more reports 228. The command(s) to the route processor 222 may include a node identifier or node pair identifier and a report type, which the route processor 222 recognizes. The route processor 222 can extract the appropriate data from the route map 224 for the report type and provides the data to the reporting module 226. The reporting module 226 formats the data according to the type of report and generates the report 228. The report may be generated in a file, printed out, and/or presented to the user via the user interface. Exemplary reports are shown in FIGS. 9-12 and described further below.

Exemplary Operations

Figure 3:
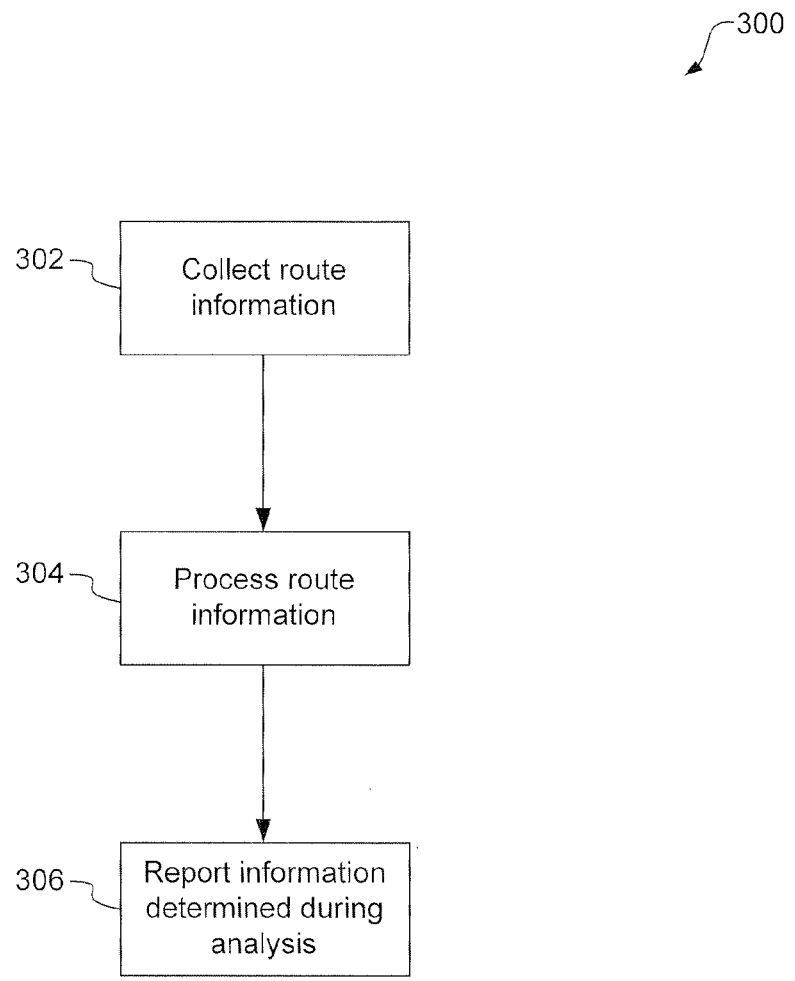
FIGS. 3-8 are flowcharts illustrating algorithms for collecting, processing and reporting route information in accordance with various embodiments.

FIGS. 3-8 are flowcharts illustrating algorithms for collecting, processing and reporting route information in accordance with various embodiments. Generally, embodiments of the auditing system carry out one or more operations or subprocesses in the auditing process. FIG. 3 illustrates some operations in accordance with one embodiment. In a collecting operation 302, route information is collected from various sources, such as network sources (e.g., network nodes) and non-network sources (e.g., business systems, accounting or billing systems). In a processing operation 304, the route information is processed to generate a map of the routes indicated by the various sources. The route processor may also determine status (e.g., viable, nonviable) or condition of routes in relation to network nodes. In a reporting operation 306, selected information from the information derived in the processing operation 304 is reported. FIGS. 4-8 further describe embodiments of operations shown in FIG. 3.

Figure 4:
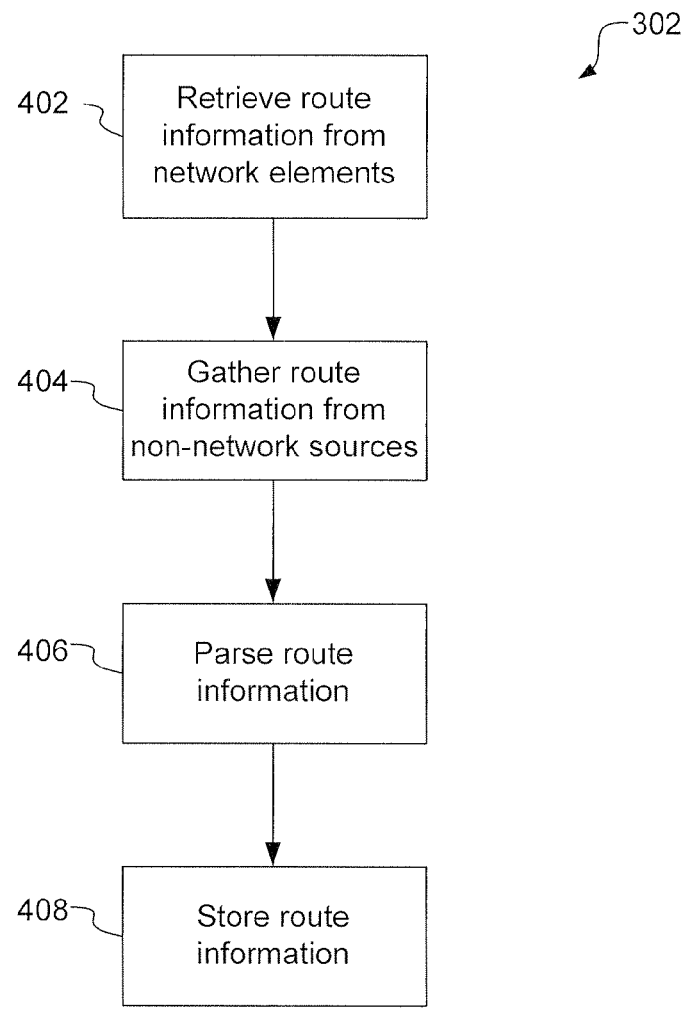

FIG. 4 is a flowchart illustrating a collecting algorithm 302 in accordance with an embodiment. In an information retrieving operation 402, route information is retrieved from numerous nodes on the network 402. The nodes from which route information is retrieved may be, without limitation, signal transfer points (STPs), signal switching points (SSPs), and media gateway controllers (MGCs). The route information retrieved from the nodes can include, without limitation, addresses, point codes (originating point codes (OPCs) or destination point codes (DPCs)), connecting nodes, routes, CICs, and route costs. Generally, multiple point codes, routes and costs will be retrieved from each network node.

In one embodiment the retrieving operation 402 involves sending commands to the various types of nodes. For example, CORBA calls can be made to MGCs. As another example, a file of routes can be read from SGX™ switches. As yet another example, Telnet communication may be setup with STPs and well-known commands sent to the STPs to retrieve routes or retrieve link sets. Of course, for other types of nodes, those skilled in the art will be able to develop commands to those types of nodes to gather the route information from those nodes.

In a gathering operation 404, route information is gathered from other non-network sources. For example, sources from systems within the network company may be queried or they may send information to the auditing system. The information may in the form of records, bills, invoices, contracts, statements, reports or others. In one particular embodiment, billing information is emailed to the auditing system. The bills indicate, among other information, charges for usage of routes through hub provider networks. The bills may be provided in a format, such as a spreadsheet, which is parsed to extract the route information.

In a parsing operation 406, the route information collected in operation 402 and 404 is parsed. Parsing operation 406 parses the information to generate route parameters, such as, but not limited to DPCs, OPCs, CICs and route costs. The parsing operation 406 typically parses information differently for different types of sources.

A storing operation 408 stores the route parameters obtained in the parsing operation 406. In one embodiment, the storing operation 408 stores the route parameters in a database. The route parameters may be stored in any of numerous formats, such as, but not limited to, object oriented, hierarchical, or flat file. In one particular embodiment, the route parameters are stored as a schema that can be used by other processes, such as during processing or reporting.

The various operations of the collecting algorithm 302 may occur automatically, for example, periodically. For example, a batch job may be executed every week or month to collect the route information. Alternatively, or in addition, operations may occur in response to a command. In some embodiments, some of the operation occur automatically and others on command.

Figure 5:
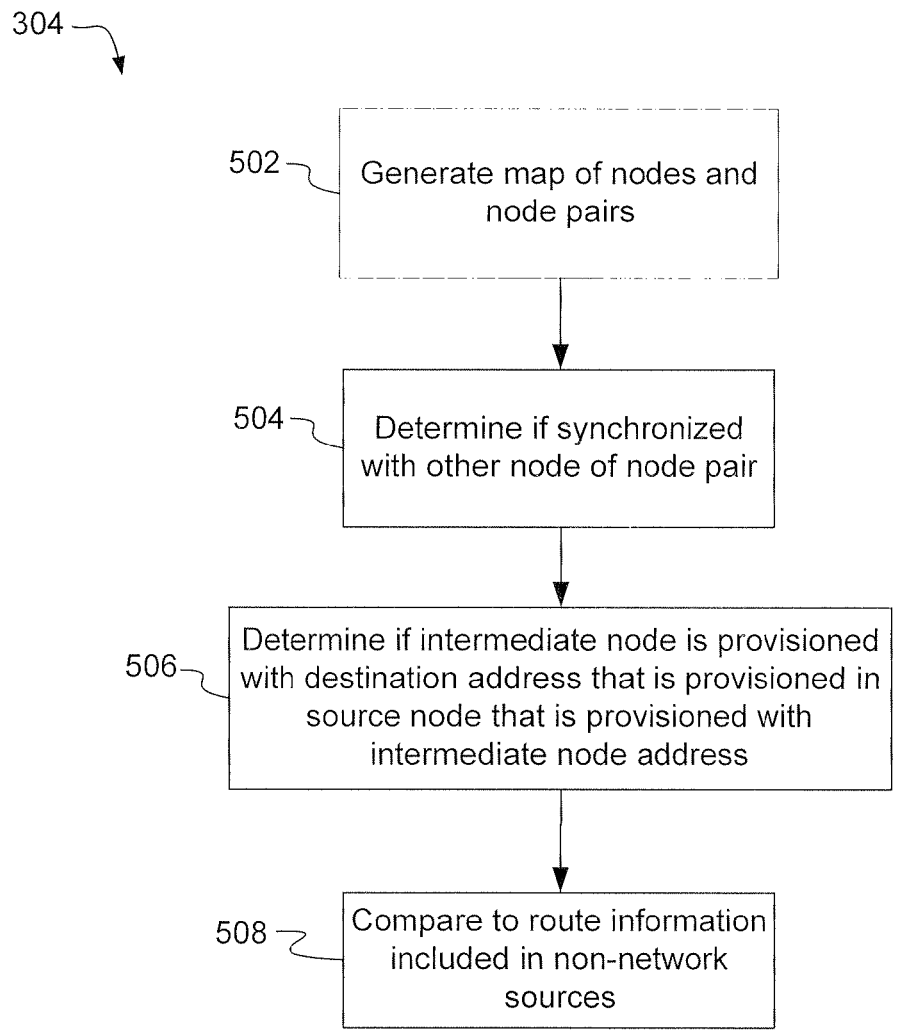

FIG. 5 is a flowchart illustrating processing algorithm 304 in accordance with an embodiment. The processing operation 304 makes use of the route parameters collected in the collecting algorithm 302. The processing operation 304 may operate prior to, or in conjunction with the reporting operation 306, discussed further below.

In a generating operation 502, a map is generated of all the nodes and node pairs based on the route parameters. The map may be hierarchical, relational, or other. One embodiment of the generating operation 502 creates the map between the STP's and switches based on linkset adjacent point codes and linkset type. For instance, a linkset of type 'A' means that the linkset is connected to a switch. A-Link's adjacent point code is mapped to the connected switch's OPC.

For node pairs, such as mated STPs, a determining operation 504 determines if the nodes in the node pair are synchronized. STPs are synchronized if the routes provisioned on the STPs are the same. This may involve comparing routes of STPs in a pair. In one embodiment, DPCs of each STP in the STP pair are compared. The STPs are considered synchronized if all meaningful routes are the same. So in some cases an STP may have some test routes that don't appear in its mated pair. In these cases DPCs can be ignored for particular devices when doing the comparison.

Another determining operation 506 determines whether nonviable routes exist. In one embodiment, the determining operation 506 determines if an intermediate node is not provisioned with a destination address that is provisioned in source node that is homed to the intermediate node. For example, the determining operation 506 determines if an STP has not been provisioned with a destination address provisioned on a switch that is homed to the STP. Put another way, the determining operation 506 checks whether destination addresses provisioned on switches are also provisioned on the STPs that the switches are homed to.

In a comparing operation 508, routes retrieved from the selected network node are compared to routes identified in non-network sources, such as bills or other records. In one embodiment of the comparing operation 508, it is determined if routes retrieved from the selected network node are shown in bills from hub providers. The comparing operation 508 may also determine whether routes shown in bills from hub providers for given nodes match routes that were retrieved from those nodes.

Figure 6:
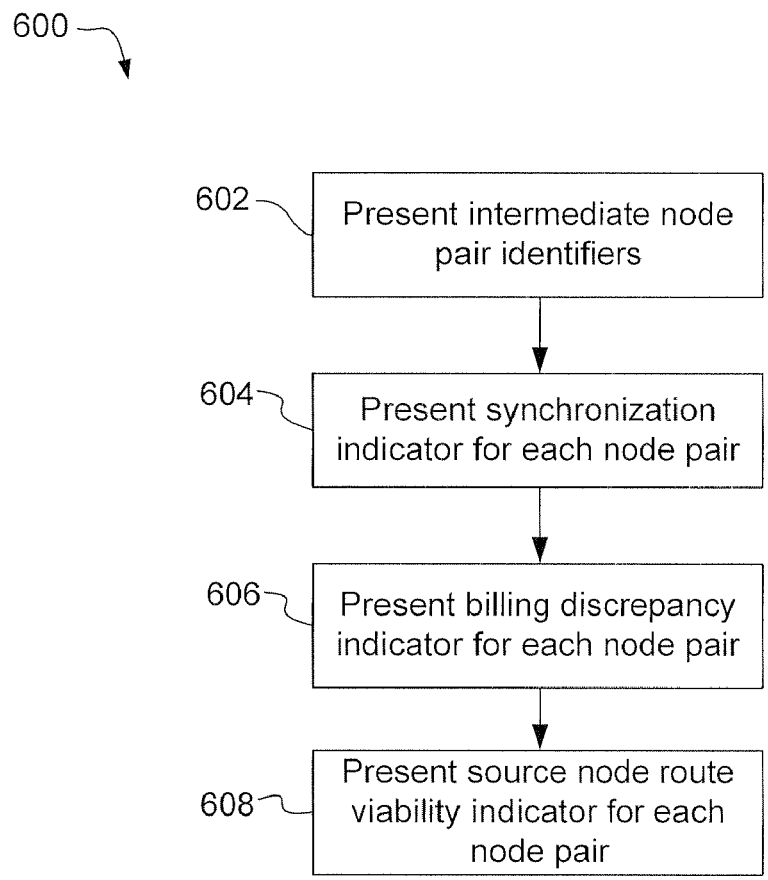
Figure 7:
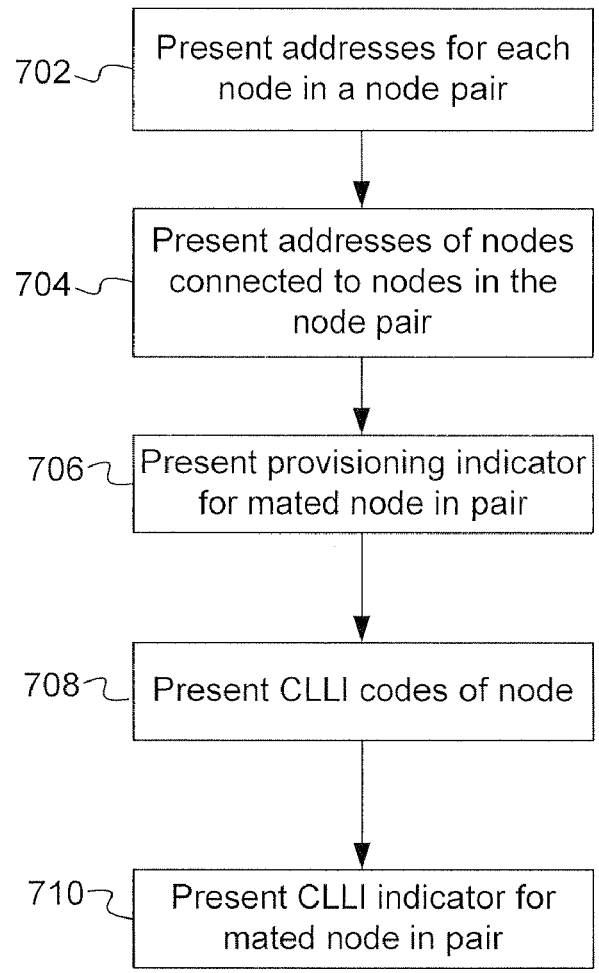
Figure 8:
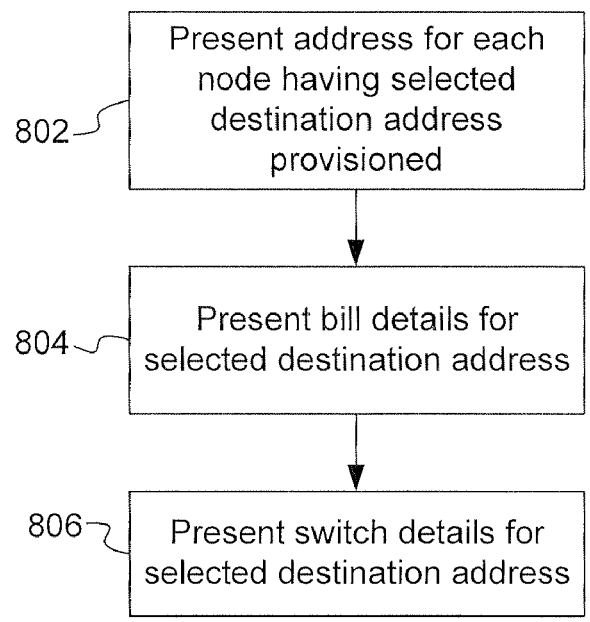

One or more of the algorithms shown in FIGS. 6-8 may be performed by the reporting operation 306 of FIG. 3. FIG. 6 is a flowchart illustrating a reporting algorithm 600 that may be used in a node pair report in accordance with an embodiment. The reporting algorithm 600 relates to the STP dashboard report 900 shown in FIG. 9, which is discussed in conjunction with FIG. 6. The report 900 in FIG. 9 and other reports shown and discussed here are in table format. However, embodiments are not limited to table formats.

In a first presenting operation 602 STP identifiers 902 for at least one STP pair 904 are presented. The identifiers may be names (e.g., Kansas City, Houston) or originating point codes (e.g., 1-255-0, 1-255-1). In another presenting operation 604, a synchronization indicator 906 is presented in association with each of the STP pairs indicating whether the STPs in the STP pair are synchronized. In one embodiment, a red "x" indicates not synchronized, and a green check mark indicates synchronized.

In another presenting operation 606 a billing discrepancy indicator 908 is presented in association with each of the STP pairs indicating whether there is a discrepancy between routes provisioned on the STPs or on switches homed to the STPs and routes indicated in one or more bills from hub network providers. A discrepancy may be indicated when a bill from a hub network provider is charging for routes connected to the STPs (or home switches), but the STPs (and homed switches) do not have the routes provisioned. A discrepancy may also be indicated when the bill does not charge for routes through the hub provider that are provisioned on the STPs or homed switches. In this embodiment, the indicator is a red "X" when there is a discrepancy and a green check mark when there are no discrepancies.

Another presenting operation 608 presents a route viability indicator 910 in association with each of the STP pairs. Each route indicator indicates whether routes associated with the STP pairs in are viable routes, meaning that they are routes that are provisioned on switches homed to the STP pairs that can be reached through the STP pair.

In another presenting operation 610, addresses such as point codes, that are associated with the nodes of the node pairs are presented. In yet another presenting operation 612, addresses of nodes connected to the identified node pairs are presented. In another presenting operation 614, multiple addresses associated with a selected node are presented. Yet another presenting operation 616 presents route indicator in association with each of the addresses. In presenting operation 616, each route indicator indicates whether there is a route between the associated address and a node of a node pair.

FIG. 7 is a flowchart illustrating a reporting algorithm 700 for reporting differences between nodes in node pairs in accordance with one embodiment. The reporting operation 700 relates to the STP difference report 1000 shown in FIG. 10, which is described in conjunction with FIG. 7.

In a presenting operation 702, originating point codes 1002 for each STP in a selected STP pair are presented. In another presenting operation 704, destination point codes 1004 associated with each of the STPs are presented in association with the OPCs 1002.

Figure 10:
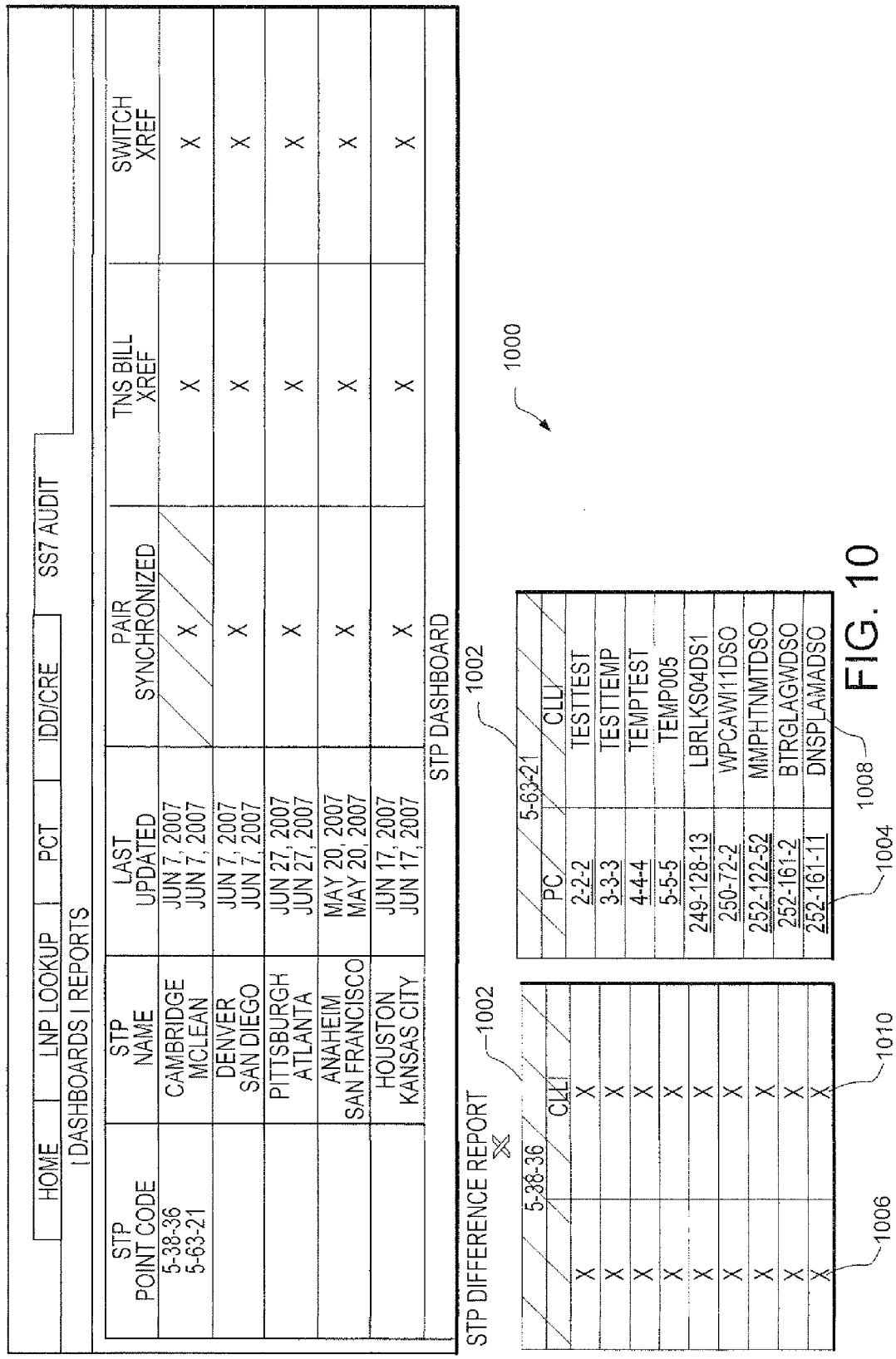

In the illustrated embodiment of FIG. 10, differences are shown between mated STP pair Cambridge and McLean. Destination point codes 1004 provisioned on the STP in McLean are presented. In the given scenario, none of the DPCs provisioned on the McLean STP are provisioned on the Cambridge STP. Accordingly, a presenting operation 706 presents a red "x" for each DPC indicator 1006 in the Cambridge STP table. Another presenting operation 708 presents CLLI codes 1008 in association with the corresponding DPC 1004 for McLean. Another presenting operation 710 presents CLLI indicators 1010 indicating whether the CLLIs of Cambridge match those of McLean. In the given scenario the CLLIs do not match, so a red "x" is presented for each.

FIG. 8 is a flowchart illustrating an algorithm 800 for reporting destination address details in accordance with one embodiment. The algorithm 800 relates to the destination point code details report 1100 shown in FIG. 11, which is discussed in conjunction with FIG. 8. In general, the destination point code report 1100 presents all the STPs that have a selected DPC provisioned on them. To illustrate, in FIG. 11, DPC 252-122-52 has been selected having a CLLI code of mmphtnmtds0.

In a presenting operation 802, the OPC 1102 of each STP having 252-122-52 is presented in an STP details table. In the illustrated embodiment the OPC is presented in association with the STP name 1104. In the illustrated scenario, the Cambridge STP is not shown as having DPC 252-122-52 provisioned on it.

In another presenting operation 804, bill details 1106 are presented in association with the selected destination point code, 252-122-52. In this embodiment, the bill details include the hub network provider name and an associated OPC.

In another presenting operation 806, switch details 1108 are presented in a switch details table. In one embodiment, the presenting operation 806 presents switch names and OPCs that have the selected DPC provisioned on them.

FIG. 12 illustrates a selected switch details report 1200 in accordance with one embodiment. Through a user interface 1202, the user can select a switch to view details for. The user can choose to view a point code report or switch details report for the selected switch. The user can also select STP pairs to view in relation to the selected switch. In the illustrated scenario of FIG. 12, the user has selected switch balmgc1 and STP pairs Cambridge/McLean and Denver/SanDiego. When the user selects a submit button 1204, a switch details report 1206 is generated.

The switch details report 1206 includes a set of destination point codes 1208 provisioned on the selected switch (balmgc1). In association with each destination point code 1208, a bill discrepancy indicator 1210 is presented. Also association with each DPC 1208 a viability indicator 1212 is presented. In the particular scenario illustrated in FIG. 12, the DPCs 1208 provisioned on the balmgc1 indicate routes through a hub network provider, and that are included in the bills from the hub network provider. Thus, there are no bill discrepancies indicated. Also shown in FIG. 12 is that the routes from balmgc1 to each DPC 1208 are viable through the Cambridge/McLean STPs, but they are not viable through the Denver/SanDiego STPs.

Exemplary Computing Device

Figure 13:
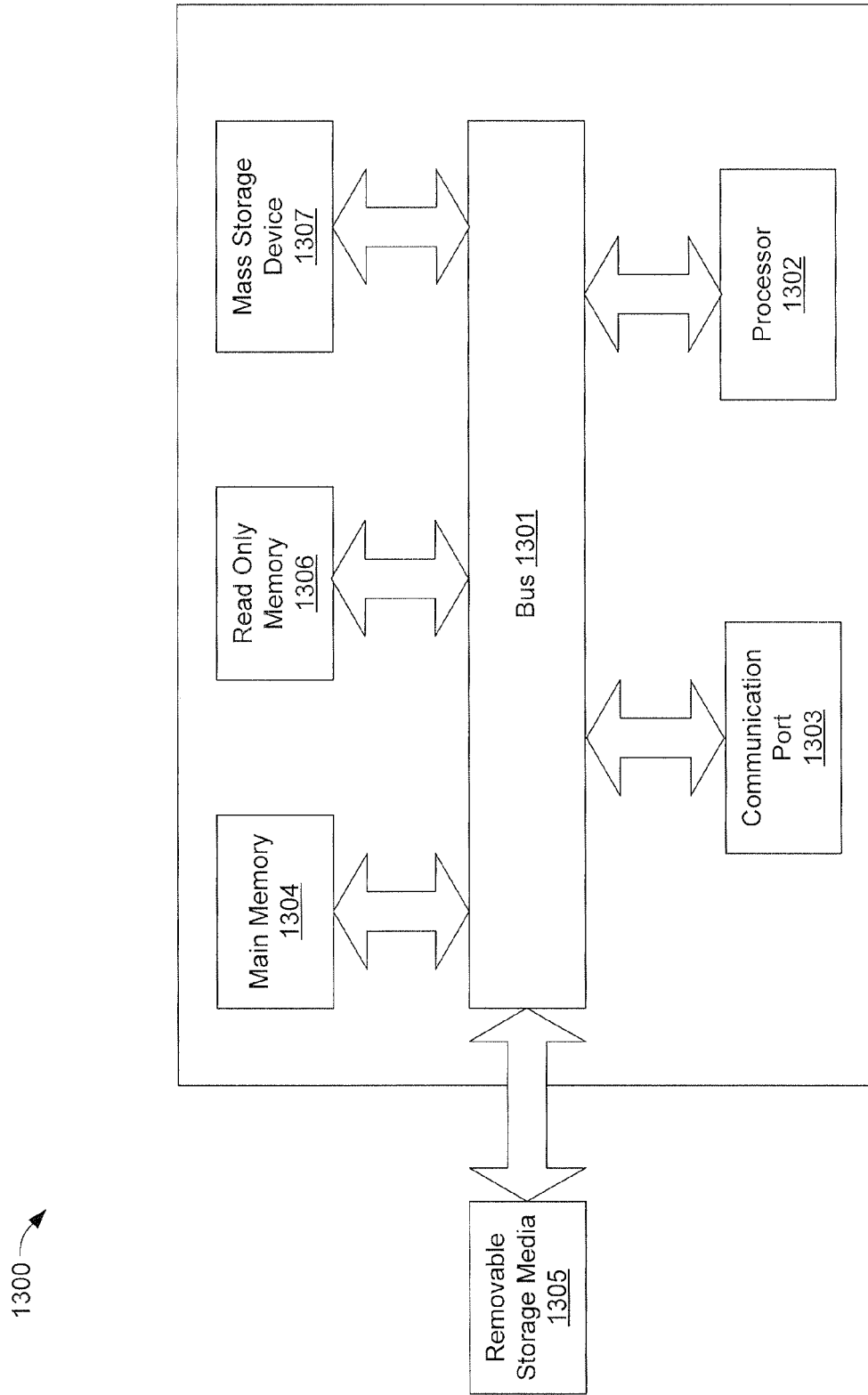
FIG. 13 illustrates a general purpose computing device upon which one or more aspects of embodiments of the present invention may be implemented.

FIG. 13 is a schematic diagram of a computing device 1300 upon which embodiments of the present invention may be implemented and carried out. For example, one or more computing devices 1300 may be used to perform various operations in auditing network routes, such as, collecting route parameters, processing the route parameters and reporting route information. As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware.

According to the present example, the computing device 1300 includes a bus 1301, at least one processor 1302, at least one communication port 1303, a main memory 1304, a removable storage media 1305, a read only memory 1306, and a mass storage 1307. Processor(s) 1302 can be any know processor, such as, but not limited to, an Intel® Itanium® or Itanium 2® processor(s), AMD® Opteron® or Athlon MP® processor(s), or Motorola® lines of processors. Communication port(s) 1303 can be any of an RS-232 port for use with a modem based dialup connection, a 10/100 Ethernet port, a Gigabit port using copper or fiber, or a USB port. Communication port(s) 1303 may be chosen depending on a network such a Local Area Network (LAN), Wide Area Network (WAN), or any network to which the computing device 1300 connects. The computing device 1300 may be in communication with peripheral devices (not shown) such as, but not limited to, printers, speakers, cameras, microphones, or scanners.

Main memory 1304 can be Random Access Memory (RAM), or any other dynamic storage device(s) commonly known in the art. Read only memory 1306 can be any static storage device(s) such as Programmable Read Only Memory (PROM) chips for storing static information such as instructions for processor 1302. Mass storage 1307 can be used to store information and instructions. For example, hard disks such as the Adaptec® family of SCSI drives, an optical disc, an array of disks such as RAID, such as the Adaptec family of RAID drives, or any other mass storage devices may be used.

Bus 1301 communicatively couples processor(s) 1302 with the other memory, storage and communication blocks. Bus 1301 can be a PCI/PCI-X, SCSI, or USB based system bus (or other) depending on the storage devices used. Removable storage media 1305 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Embodiments of the present invention include various steps, which will be described in this specification and attached Appendix. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Embodiments of the present invention may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

What is claimed is:

1. A computer-implemented method for auditing routes in a network, the method comprising:
    collecting route parameters from a first node in the network, wherein the route parameters are indicative of routes configured in the first node;
    based at least in part on the route parameters from the first node, determining whether routes indicated by the route parameters from the first node correspond to routes configured in a second node in the network, wherein the first node or the second node comprises a Signal transfer Point (STP);
    collecting route parameters from a non-network source identifying route parameters indicative of routes purportedly used by the first node; and
    determining whether a discrepancy exists between routes indicated by the non-network source of route parameters and the routes indicated by the route parameters collected from the first node.

2. The computer-implemented method of claim 1, wherein the first node and the second node comprise a mated pair of nodes.

3. The computer-implemented method of claim 2, wherein the mated pair of nodes comprises a Signal transfer Point (STP).

4. The computer-implemented method of claim 1, further comprising determining whether a route configured in a third node that is homed to the first node is also configured in the first node.

5. The computer-implemented method of claim 1, wherein the non-network source of route parameters comprises one or more of a bill, a report, or an invoice.

6. The computer-implemented method of claim 1, wherein the route parameters from the first node comprise one or more point codes and one or more route costs.

7. The computer-implemented method of claim 1, wherein the network comprises a Signaling System 7 (SS7) network.

8. A method for choosing a route to be used between a source node and a destination node over a network, the method comprising:
    collecting route parameters from a first intermediate node and a second intermediate node that can be configured to communicatively couple the source node to the destination node, wherein the source node comprises a Signal switching Point (SSP) and the network comprises a Signaling System 7 (SS7) network and wherein the first intermediate node or the second intermediate node comprises a Signal transfer Point (STP);
    based on the collected route parameters, determining at least a first route through the first intermediate node and a second route through the second intermediate node, wherein the first and second routes can be used by the source node to communicate with the destination node; and
    determining which route among the first route and the second route is optimal according to one or more criteria.

9. The method of claim 8 wherein the one or more criteria comprise route cost.

10. The method as recited in claim 8, wherein the route parameters comprise one or more point codes and one or more route costs.

11. A method for choosing a route to be used between a source node and a destination node over a network, the method comprising:
    collecting route parameters from a first intermediate node and a second intermediate node that can be configured to communicatively couple the source node to the destination node, wherein the first intermediate node or the second intermediate node comprises a Signal transfer Point (STP) and the network comprises a Signaling System 7 (SS7) network;

based on the collected route parameters, determining at least a first route through the first intermediate node and a second route through the second intermediate node, wherein the first and second routes can be used by the source node to communicate with the destination node; and determining which route among the first route and the second route is optimal according to one or more criteria.

12. The method as recited in claim 11, wherein the one or more criteria comprise route cost.

13. The method as recited in claim 11, wherein the source node comprises a Signal switching Point (SSP).

14. The method as recited in claim 11, wherein the route parameters comprise one or more point codes and one or more route costs.

\* \* \* \* \*